United States Patent
Foo et al.

(10) Patent No.: US 9,782,721 B2
(45) Date of Patent: Oct. 10, 2017

(54) LOW TEMPERATURE UREA-SCR OPERATION IN THE PRESENCE OF HIGH SULPHUR FLUE GAS

(71) Applicant: Johnson Matthey Public Limited Company, London (GB)

(72) Inventors: Rodney Foo, Nivelles (BE); Rainer Leppelt, Michelau (DE); Joerg Werner Muench, Lichtenfels (DE); Ralf Dotzel, Nuremberg (DE); Maria Brandmair, Fahrenzhausen (DE)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/009,978

(22) Filed: Jan. 29, 2016

(65) Prior Publication Data

US 2016/0220954 A1     Aug. 4, 2016

Related U.S. Application Data

(60) Provisional application No. 62/109,828, filed on Jan. 30, 2015.

(51) Int. Cl.
| | |
|---|---|
| *B01D 53/86* | (2006.01) |
| *B01D 53/90* | (2006.01) |
| *B01D 53/94* | (2006.01) |
| *F01N 3/20* | (2006.01) |

(52) U.S. Cl.
CPC ..... *B01D 53/8609* (2013.01); *B01D 53/8625* (2013.01); *B01D 53/8671* (2013.01); *B01D 53/8696* (2013.01); *B01D 53/90* (2013.01); *B01D 53/9409* (2013.01); *F01N 3/208* (2013.01); *B01D 2251/2067* (2013.01); *B01D 2251/40* (2013.01); *B01D 2255/20723* (2013.01); *B01D 2255/9155* (2013.01); *B01D 2257/404* (2013.01); *B01D 2258/0283* (2013.01); *F01N 2570/04* (2013.01); *F01N 2610/01* (2013.01); *F01N 2610/02* (2013.01); *F01N 2900/1404* (2013.01); *F01N 2900/1602* (2013.01)

(58) Field of Classification Search
None
See application file for complete search history.

(56) References Cited

FOREIGN PATENT DOCUMENTS

| | | |
|---|---|---|
| EP | 2144691 A1 | 1/2010 |
| FR | 2914688 A1 | 10/2008 |
| JP | 2007-138887 A | 6/2007 |
| JP | 2007138887 A | 6/2007 |
| WO | 2008126118 A1 | 10/2008 |
| WO | 2014044318 A1 | 3/2014 |

OTHER PUBLICATIONS

Crocker et al.; SCR Catalyst Blinding due to Sodium and Calcium Sulfate Formation; Prepr. Pap.-Am. Chem. Soc., Div. Fuel Chem. 2004, 49 (1), 169).

*Primary Examiner* — Melvin C Mayes
*Assistant Examiner* — Sheng H Davis

(57) ABSTRACT

Systems and methods of continuous operation of a urea-SCR system at low temperatures (200-350° C.) in the presence of high SOx containing flue gas are described. The methods comprise introducing a solution of urea and an $NO_2$ forming compound, preferably an alkaline earth metal nitrate, into an exhaust stream before the exhaust stream contacts an SCR catalyst.

20 Claims, 2 Drawing Sheets

LOW TEMPERATURE UREA-SCR OPERATION IN THE PRESENCE OF HIGH SULPHUR FLUE GAS

FIELD OF THE INVENTION

The present invention relates to a selective catalytic reduction (SCR) system and methods for the reduction of nitrogen oxide emissions in flue gas. The system is able to operate continuously with the SCR catalyst at low temperatures (250-350° C.) with high SOx (20 ppm or greater) containing flue gas without deactivating due to the formation of ammonium bisulphate and/or improved deNOx performance at low temperatures.

BACKGROUND

There has been an overall trend in recent years towards lower exhaust temperatures in many applications, both industrial and mobile, that use urea-SCR emission controls systems. These reductions in exhaust temperatures are driven by variety of reasons that includes improvements in fuel efficiency, engine operation modes, among others.

The use of lower exhaust temperatures poses significant challenges to current SCR technology due to the presence of SOx species in the flue gases primarily derived from some fuel sources such as oil and coal. The combination of low temperature and high sulphur content will lead to formation of ammonium bisulphates (ABS) that will deactivate the SCR catalyst by masking effects. To prevent the formation of ABS, it is required to either increase the operating temperature, so that ABS formation does not take place, or scrub the SOx species prior to the SCR unit. Both of these procedures are either technically unfeasible or economically undesirable. Another solution to this problem is to operate engines using low or ultra-low sulphur fuels. However; this carries with it an economic penalty in that the cost of low or ultra-low sulphur fuels are typically much greater than the cost of sulphur rich fuel. In addition, the availability of such low sulphur fuels may also be limited.

It is widely known in the field of flue gas catalysis that the SCR reaction can be promoted by the presence of $NO_2$. However, it has not been possible to find an economical solution to generate $NO_2$ for non-automotive applications due to the volume of catalyst required, the associated cost of the catalyst and the variations in the costs and compositions of various fuels. The most common method of generating $NO_2$ would be via an oxidation catalyst that is generally in some systems to abate carbon monoxide (CO) and hydrocarbons (HCs). However, these oxidation catalysts are also highly sensitive to SOx species and undergo rapid deactivation. Thus there is a need for a system that allows for the continuous operation of a urea-SCR system at low temperatures that is operated in the presence of high SOx containing flue gas.

SUMMARY OF THE INVENTION

This invention relates to a selective catalytic reduction (SCR) system for the reduction of nitrogen oxide emissions in flue gas. The system is able to operate continuously with the SCR catalyst at low temperatures in the presence of high sulphur containing flue gases. Typically the performance of an SCR catalyst will deteriorate with operating time at low temperatures in the presence of both urea/$NH_3$ reductant and SOx species due to the formation of ammonium bisulphate salts that deactivate the SCR catalyst. Disclosed is a system that overcomes these limitations. The invention also relates to methods of: (1) using such as catalytic system; (2) reducing the amount of $SO_3$ in a flue gas, (3) reducing the formation of ammonium bisulphate in a urea-SCR system, (4) reducing the deactivation of SCR catalyst in a urea-SCR system, (5) increasing the efficiency of a system that produces flue gases where the flue gasses are treated using a urea-SCR system, and (6) changing the SCR reaction kinetics in a process for treating a flue gas comprising sulphur using a urea-SCR system.

BRIEF DESCRIPTION OF THE DRAWINGS

The invention will be better understood and its advantages will become more apparent from the following detailed description, especially when taken with the accompanying drawings.

DETAILED DESCRIPTION OF THE INVENTION

Figure 1:
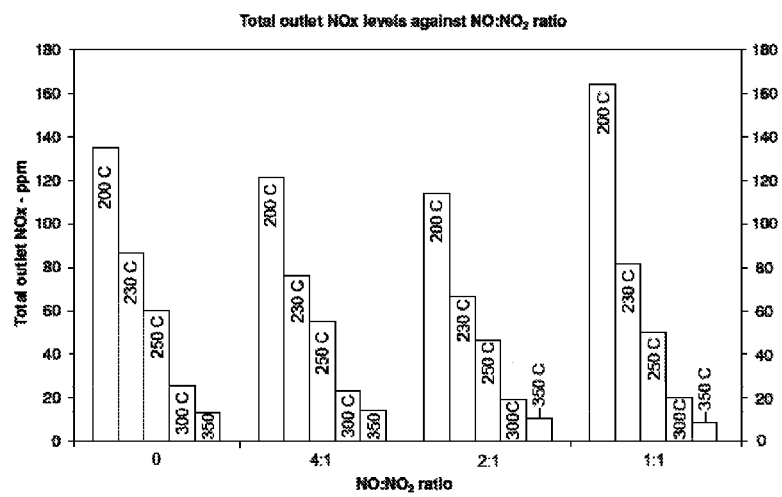
FIG. 1 is a graph showing the total outlet NOx levels at different temperatures.

The term alkaline earth metal nitrate means a salt of an alkaline earth metal and a nitrate. The term alkaline earth metal means the metals beryllium, magnesium, calcium, strontium, barium and radium, with calcium and magnesium being the preferred alkaline earth metals.

The term iron nitrate, as used herein, means iron (II) nitrate, iron (III) nitrate, or combinations thereof.

The term manganese nitrate, as used herein, means manganese (II) nitrate, manganese (III) nitrate, or combinations thereof.

Reference to temperatures herein means the temperature of the SCR catalyst.

As used herein, the term "about" means approximately and refers to a range that is optionally ±25%, preferably ±10%, more preferably, ±5%, or most preferably ±1% of the value with which the term is associated.

The term "flue gas" refers to gas produced from the combustion of a fuel, typically at a power plant. The composition of flue gas depends upon the material being burned and the conditions under which the material is burned. Flue gas typically comprises mostly nitrogen with smaller amounts of carbon dioxide ($CO_2$), water vapor and oxygen, and a small percentage of pollutants such as particulate matter, carbon monoxide, nitrogen oxides and sulfur oxides. SCR technology has been used for many years to control NOx emissions from power plants and other stationary sources. The process of controlling NOx emissions is broadly described as passing hot flue gas over a catalyst in the presence of a nitrogenous reductant, such as ammonia or urea (a compound that converts to ammonia). An extruded honeycomb monolith catalyst comprising $V_2O_5$—$WO_3$/$TiO_2$ has often been used. The conversion is generally described as occurring according to the "Standard SCR" reaction (1):

$$4NH_3 + 4NO + O_2 \rightarrow 4N_2 + 6H_2O \qquad (1)$$

The Standard SCR reaction is composed of several reactions, with the two most important reactions being label as the "Fast reaction" and the "Slow reaction" as shown below.

$$2NH_3+NO+NO_2 \rightarrow 2N_2+3H_2O \text{—Fast reaction} \quad (2)$$

$$8NH_3+6NO_2 \rightarrow 7N_2+12H_2O \text{—Slow reaction} \quad (3)$$

Because of the fast SCR reaction (2), the addition of $NO_2$ to the system can accelerate the rate of consumption of $NH_3$ such that little to no $NH_3$ remains to react with the $SO_3$ in the flue gas.

By adding a $NO_2$ forming additive into the urea solution, the NOx conversion can be increased using existing system by simply changing the composition of the solution being sprayed into the flue gas. Separate solutions of urea and the at least one $NO_2$ forming additive can be prepared, placed in dual feed tanks and injected together into the flue gas stream before the SCR catalyst. A valve can be used to control the proportions of the urea and the at least one $NO_2$ forming additive being injected through a common mixing line into one or more injectors. In some applications, the solutions can be injected using an injector grid. Alternatively, separate solutions of urea and the $NO_2$ forming additive can be prepared and injected separately into the flue gas stream before the SCR catalyst. This could provide additional flexibility in providing optimal levels of urea and the $NO_2$ forming additive and allow the amount of each of these materials to be independently changed based on the fuel source, contaminants associated with the fuel source, at the operating conditions of the system.

The system described herein allows for low temperature operation of an SCR unit in the presence of high sulphur content flue gas. This is particular advantageous in marine applications, especially for post-turbo 2 stroke marine engines. This was previously not possible because the use of low temperatures and fuel with a high sulphur content lead to formation of ammonium bisulphate (ABS) and ammonium sulfate, as shown in equations (4) and (5), respectively. Ammonium bisulphate has a masking and fouling effect on SCR catalysts and exhaust systems.

$$NH_3+SO_3+H_2O \rightarrow NH_4HSO_4 \quad (4)$$

$$2NH_3+SO_3+H_2O \rightarrow (NH_4)_2SO_4 \quad (5)$$

Various sources can be used to provide $NO_2$. The sources include $N_2O_4$ or $N_2O_5$. $NO_2$ is typically created via oxidation of NO and is difficult to pressurize as it forms $N_2O_4$ under high pressure. It is possible to obtain solid or liquid states of $N_2O_4$ or $N_2O_5$ that can be used to generate $NO_2$ by gentle heating that would then be feed into the flue gas or directly into the urea injection as a liquid. Other sources that can be used to provide $NO_2$ include various metal nitrates, with alkaline earth metal nitrates being preferred metal nitrates. Calcium nitrate and magnesium nitrate are the preferred alkaline earth metals. Other preferred metal nitrates, which are not alkaline earth metal nitrates, are iron nitrate and manganese nitrate.

The solution comprising urea and at least one $NO_2$ forming compound can comprise a calcium nitrate urea complex known as Cal-Urea ($Ca(NO_3)_2 \cdot 4[OC(NH_2)_2]$) which has been sold as a fertilizer. Another fertilizer is the combination of calcium nitrate and ammonium nitrate. This fertilizer, known as the "double salt", has the formula: $5Ca(NO_3)_2 \cdot NH_4NO_3 \cdot 10H_2O$ and comprises 19% calcium.

The use of metal nitrates provides for the removal of sulphur from the flue gas stream. For example, calcium nitrate ($Ca(NO_3)_2$) decomposes as described below in equation (6).

$$2Ca(NO_3)_2 \rightarrow 2CaO+4NO_2+O_2 \quad (6)$$

The calcium oxide (CaO) formed can react with other gaseous species in the flue gas such as sulphur trioxide ($SO_3$) to form calcium sulphate ($CaSO_4$) as shown in equation (7):

$$CaO+SO_3 \rightarrow CaSO_4 \quad (7)$$

The formation of calcium sulphate would be beneficial in removing $SO_3$ from the flue gas and would further reduce the possibility of ABS formation. It is currently recognized that the presence of calcium oxide itself, within the catalysts structure, does not result in catalysts deactivation. The methods described herein allow for calcium sulphate to be formed to pass through the catalyst or be deposited on the surface of the catalyst where it can be removed with soot blowers. Some of the calcium sulphate may become trapped on the outer surfaces of catalyst monoliths, where it can be removed by such systems as soot blowers or vibrators. This can be expected to lengthen the time before a catalyst becomes deactivated. This process for the formation of calcium sulphate may also allow the calcium sulphate to move through the SCR system and be removed downstream of the catalysts using various removal techniques, including scrubbers or deposition as a solid.

Phosphates are another group of compounds known to poison SCR catalysts. Phosphates, like sulphates, can react with the metal that is part of a metal salt of a nitrate or the metal in a mixture of a metal containing compound and $N_2O_4$, $N_2O_5$. This will allow phosphates to be removed from the flue gas stream along with the removal of sulphates.

The addition of ammonium nitrate to the flue gas will result in the formation of ammonium bisulfate, which is known to deactivate SCR catalysts. Ammonium nitrate will decompose to form intermediates that lead to the formation of $NO_2$ as illustrated in equations (8) and (9):

$$NH_4NO_3 \leftrightarrow NH_3+HNO_3 \quad (8)$$

$$2HNO_3+NO \leftrightarrow 3NO_2+H_2O \quad (9)$$

Unreacted $NH_4NO_3$ can react with NO to form $NO_2$ and that would eliminate any excess salt that was not thermally decomposed as given in equation (10)

$$NO+NH_4NO_3 \rightarrow NO_2+N_2+2H_2O \quad (10)$$

Reactions (9) and (10) both use NO as reactants. This reduces the amount of NO available for use in the fast reaction and therefore the rate of the fast reaction would be slowed.

$$2NH_3+NO+NO_2 \rightarrow 2N_2+3H_2O \text{—Fast reaction} \quad (2)$$

It was known that the addition of ammonia, phosphorus, and catalyst enhances the formation of phosphates and sulphates. (Charlene R. Crocker, et al. SCR Catalyst Blinding Due To Sodium and Calcium Sulfate Formation; Prepr. Pap.-Am. Chem. Soc., Div. Fuel Chem. 2004, 49 (1), 169) Reducing the amount of ammonia added to the system can be expected to reduce the amount of sulphates and phosphates in flue gas.

The process and methods described herein promote the fast SCR reaction by forming $NO_2$, such as through the decomposition of nitrates dissolved in the urea dosing solution. The fast SCR reaction will be favoured, which leads to an increased rate of $NH_3$ consumption and an increase in the amount of $NH_3$ consumed, such that little to no $NH_3$ remains to react with SOx to form ABS. The use of a metal salt of a nitrate allows for the added benefit of removable of undesired sulphates and phosphates.

Promoting the fast SCR reaction through the addition of $NO_2$ via nitrate decomposition or the addition of other $NO_2$ forming compounds, it is possible to operate SCR systems at lower temperatures than were previously used, where the formation of ABS would have lowered the activity of the SCR catalyst.

In one aspect, the present invention relates to a system comprising: (a) a solution comprising urea and at least one $NO_2$ forming compound, wherein the at least one $NO_2$ forming compound comprises: (i) a metal salt of a nitrate; (ii) a mixture of a metal containing compound and $N_2O_4$ or $N_2O_5$, or mixtures thereof; or (iii) mixtures of (i) and (ii), (b) an SCR catalyst and (c) a device for introducing the solution into a flue gas stream prior to the flue gas coming in contact with an SCR catalyst, where the introduction of the solution allows for the continuous operation of the system at a temperature in the range of about 200 to about 350° C. and the flue gas comprises SOx at a concentration of 20 ppm or greater prior to the flue gas coming in contact with an SCR catalyst. The at least one $NO_2$ forming compound can comprise a metal salt of a nitrate, preferably an alkaline earth metal nitrate, iron nitrate, manganese nitrate or mixtures thereof. The metal salt of a nitrate can be calcium nitrate or magnesium nitrate, preferably calcium nitrate. The solution comprising urea and at least one $NO_2$ forming compound can comprise $Ca(NO_3)_2 \cdot 4[OC(NH_2)_2]$, $5Ca(NO_3)_2 \cdot NH_4NO_3 \cdot 10H_2O$ or mixtures thereof. The at least one $NO_2$ forming compound can comprise a mixture of a metal containing compound and $N_2O_4$, $N_2O_5$, or mixtures thereof; where the at least one $NO_2$ forming compound is a metal salt, preferably an alkaline earth metal salt, an iron salt, a manganese salt or mixtures thereof. The at least one $NO_2$ forming compound can comprise a mixture of (i) a metal salt of a nitrate; and (ii) a mixture of a metal containing compound and $N_2O_4$, $N_2O_5$, or mixtures thereof.

In another aspect, the present invention relates to a method of continuously operating a urea-SCR system, the method comprising introducing a solution comprising urea and at least one $NO_2$ forming compound into a flue gas stream comprising SOx at a concentration of 20 ppm or greater prior to the flue gas coming in contact with an SCR catalyst wherein the urea-SCR system is at a temperatures in the range of about 200 to about 350° C. The at least one $NO_2$ forming compound can comprise a metal salt of a nitrate, preferably an alkaline earth metal nitrate, iron nitrate, manganese nitrate or mixtures thereof. The metal salt of a nitrate can be calcium nitrate or magnesium nitrate, preferably calcium nitrate. The solution comprising urea and at least one $NO_2$ forming compound can comprise $Ca(NO_3)_2 \cdot 4[OC(NH_2)_2]$, $5Ca(NO_3)_2 \cdot NH_4NO_3 \cdot 10H_2O$ or mixtures thereof. The at least one $NO_2$ forming compound can comprise a mixture of a metal containing compound and $N_2O_4$, $N_2O_5$, or mixtures thereof; where the at least one $NO_2$ forming compound is a metal salt, preferably an alkaline earth metal salt, an iron salt, a manganese salt or mixtures thereof. The at least one $NO_2$ forming compound can comprise a mixture of (i) a metal salt of a nitrate; and (ii) a mixture of a metal containing compound and $N_2O_4$, $N_2O_5$, or mixtures thereof.

In yet another aspect, the present invention relates to a method of reducing the amount of SO3 in a flue gas, said method comprising introducing a solution comprising urea, a compound comprising an alkaline earth metal, iron or manganese, and an $NO_2$ forming compound into a flue gas stream prior to the flue gas coming in contact with an SCR catalyst, wherein the compound comprising an alkaline earth metal, iron or manganese and an $NO_2$ forming compound may be the same compound or different compounds. The method can preferably be used when the flue gas comprises $SO_3$ and the flue gas contacts the SCR catalyst at a temperature in the range of about 200 to about 350° C. The method can also reduce the amount of phosphate in the flue gas after the flue gas comes in contact with the SCR catalyst. The at least one $NO_2$ forming compound can comprise a metal salt of a nitrate, preferably an alkaline earth metal nitrate, iron nitrate, manganese nitrate or mixtures thereof. The metal salt of a nitrate can be calcium nitrate or magnesium nitrate, preferably calcium nitrate. The solution comprising urea and at least one $NO_2$ forming compound can comprise $Ca(NO_3)_2 \cdot 4[OC(NH_2)_2]$, $5Ca(NO_3)_2 \cdot NH_4NO_3 \cdot 10H_2O$ or mixtures thereof. The at least one $NO_2$ forming compound can comprise a mixture of a metal containing compound and $N_2O_4$, $N_2O_5$, or mixtures thereof; where the at least one $NO_2$ forming compound is a metal salt, preferably an alkaline earth metal salt, an iron salt, a manganese salt or mixtures thereof. The at least one $NO_2$ forming compound can comprise a mixture of (i) a metal salt of a nitrate; and (ii) a mixture of a metal containing compound and $N_2O_4$, $N_2O_5$, or mixtures thereof.

In still another aspect, the present invention relates to a method of reducing the formation of ammonium bisulphate in a urea-SCR system, the method comprising introducing a solution comprising urea and at least one $NO_2$ forming compound into a flue gas stream prior to the flue gas coming in contact with an SCR catalyst. The flue gas can comprise SOx at a concentration of 20 ppm or greater prior to the flue gas coming in contact with the SCR catalyst. The flue gas can contact the SCR catalyst at a temperature in the range of about 200 to about 350° C. Preferably, the flue gas can comprise SOx at a concentration of 20 ppm or greater prior to the flue gas coming in contact with the SCR catalyst and the flue gas can contact the SCR catalyst at a temperature in the range of about 200 to about 350° C. The method can also reduce the amount of phosphate in the flue gas after the flue gas comes in contact with the SCR catalyst. The at least one $NO_2$ forming compound can comprise a metal salt of a nitrate, preferably an alkaline earth metal nitrate, iron nitrate, manganese nitrate or mixtures thereof. The metal salt of a nitrate can be calcium nitrate or magnesium nitrate, preferably calcium nitrate. The solution comprising urea and at least one $NO_2$ forming compound can comprise $Ca(NO_3)_2 \cdot 4[OC(NH_2)_2]$, $5Ca(NO_3)_2 \cdot NH_4NO_3 \cdot 10H_2O$ or mixtures thereof. The at least one $NO_2$ forming compound can comprise a mixture of a metal containing compound and $N_2O_4$, $N_2O_5$, or mixtures thereof; where the at least one $NO_2$ forming compound is a metal salt, preferably an alkaline earth metal salt, an iron salt, a manganese salt or mixtures thereof. The at least one $NO_2$ forming compound can comprise a mixture of (i) a metal salt of a nitrate; and (ii) a mixture of a metal containing compound and $N_2O_4$, $N_2O_5$, or mixtures thereof.

In another aspect, the present invention relates to a method of reducing the deactivation of SCR catalyst in a urea-SCR system, the method comprising introducing a solution comprising urea and at least one $NO_2$ forming compound into a flue gas stream prior to the flue gas coming in contact with an SCR catalyst. The flue gas can comprise SOx at a concentration of 20 ppm or greater prior to the flue gas coming in contact with the SCR catalyst. The flue gas can contact the SCR catalyst at a temperature in the range of about 200 to about 350° C. Preferably, the flue gas can comprise SOx at a concentration of 20 ppm or greater prior to the flue gas coming in contact with the SCR catalyst and the flue gas can contact the SCR catalyst at a temperature in the range of about 200 to about 350° C. The method can also reduce the amount of phosphate in the flue gas after the flue gas comes in contact with the SCR catalyst. The at least one NO₂ forming compound can comprise a metal salt of a nitrate, preferably an alkaline earth metal nitrate, iron nitrate, manganese nitrate or mixtures thereof. The metal salt of a nitrate can be calcium nitrate or magnesium nitrate, preferably calcium nitrate. The solution comprising urea and at least one NO₂ forming compound can comprise Ca(NO₃)₂.4[OC(NH₂)₂], 5Ca(NO₃)₂.NH₄NO₃.10H₂O or mixtures thereof. The at least one NO₂ forming compound can comprise a mixture of a metal containing compound and N₂O₄, N₂O₅, or mixtures thereof; where the at least one NO₂ forming compound is a metal salt, preferably an alkaline earth metal salt, an iron salt, a manganese salt or mixtures thereof. The at least one NO₂ forming compound can comprise a mixture of (i) a metal salt of a nitrate; and (ii) a mixture of a metal containing compound and N₂O₄, N₂O₅, or mixtures thereof.

In yet another aspect, the present invention relates to a method of increasing the efficiency of a system that produces flue gases where the flue gasses are treated using a urea-SCR system, the method comprising introducing a solution comprising urea and at least one NO₂ forming compound into a flue gas stream flue gas comprises $SO_x$ at a concentration of 20 ppm or greater prior to the flue gas coming in contact with the SCR catalyst, wherein at least one of: (1) the temperature of the flue gas contacting the SCR catalyst and (2) the volume of the SCR catalyst used, is reduced compared to a similar system that does not introduce at least one NO₂ forming compound into a flue gas stream prior to the flue gas coming in contact with an SCR catalyst. The flue gas can comprise SOx at a concentration of 20 ppm or greater prior to the flue gas coming in contact with the SCR catalyst. The flue gas can contact the SCR catalyst at a temperature in the range of about 200 to about 350° C. Preferably, the flue gas can comprise SOx at a concentration of 20 ppm or greater prior to the flue gas coming in contact with the SCR catalyst and the flue gas can contact the SCR catalyst at a temperature in the range of about 200 to about 350° C. The method can also reduce the amount of phosphate in the flue gas after the flue gas comes in contact with the SCR catalyst. The at least one NO₂ forming compound can comprise a metal salt of a nitrate, preferably an alkaline earth metal nitrate, iron nitrate, manganese nitrate or mixtures thereof. The metal salt of a nitrate can be calcium nitrate or magnesium nitrate, preferably calcium nitrate. The solution comprising urea and at least one NO₂ forming compound can comprise Ca(NO₃)₂.4[OC(NH₂)₂], 5Ca(NO₃)₂.NH₄NO₃.10H₂O or mixtures thereof. The at least one NO₂ forming compound can comprise a mixture of a metal containing compound and N₂O₄, N₂O₅, or mixtures thereof; where the at least one NO₂ forming compound is a metal salt, preferably an alkaline earth metal salt, an iron salt, a manganese salt or mixtures thereof. The at least one NO₂ forming compound can comprise a mixture of (i) a metal salt of a nitrate; and (ii) a mixture of a metal containing compound and N₂O₄, N₂O₅, or mixtures thereof.

In still another aspect, the present invention relates to a method of changing the SCR reaction kinetics in a process for treating a flue gas comprising sulphur using a urea-SCR system, the method comprising introducing a solution comprising urea and at least one NO₂ forming compound into a flue gas stream comprising $SO_x$ at a concentration of 20 ppm or greater prior to the flue gas coming in contact with the SCR catalyst, wherein at least one of: (1) the temperature of the flue gas contacting the SCR catalyst and (2) the volume of the SCR catalyst used, is reduced compared to a similar system that does not introduce at least one NO₂ forming compound into a flue gas stream prior to the flue gas coming in contact with an SCR catalyst. The conversion of $NO_x$ using SCR has been described using the "Standard SCR" reaction, with the two most important reactions being label as the "Fast reaction" and the "Slow reaction" as described above. Because of the fast SCR reaction, the addition of NO₂ to the system can accelerate the rate of consumption of NH₃ such that little to no NH₃ remains to react with the SO₃ in the flue gas to form ammonium bisulphates or other compounds that deactivate the catalyst. The flue gas can comprise SOx at a concentration of 20 ppm or greater prior to the flue gas coming in contact with the SCR catalyst. The flue gas can contact the SCR catalyst at a temperature in the range of about 200 to about 350° C. Preferably, the flue gas can comprise SOx at a concentration of 20 ppm or greater prior to the flue gas coming in contact with the SCR catalyst and the flue gas can contact the SCR catalyst at a temperature in the range of about 200 to about 350° C. The method can also reduce the amount of phosphate in the flue gas after the flue gas comes in contact with the SCR catalyst. The at least one NO₂ forming compound can comprise a metal salt of a nitrate, preferably an alkaline earth metal nitrate, iron nitrate, manganese nitrate or mixtures thereof. The metal salt of a nitrate can be calcium nitrate or magnesium nitrate, preferably calcium nitrate. The solution comprising urea and at least one NO₂ forming compound can comprise Ca(NO₃)₂.4[OC(NH₂)₂], 5Ca(NO₃)₂.NH₄NO₃.10H₂O or mixtures thereof. The at least one NO₂ forming compound can comprise a mixture of a metal containing compound and N₂O₄, N₂O₅, or mixtures thereof; where the at least one NO₂ forming compound is a metal salt, preferably an alkaline earth metal salt, an iron salt, a manganese salt or mixtures thereof. The at least one NO₂ forming compound can comprise a mixture of (i) a metal salt of a nitrate; and (ii) a mixture of a metal containing compound and N₂O₄, N₂O₅, or mixtures thereof.

Alternatively, for each of the above systems and methods, the urea can be in a separate solution from the solution comprising the at least one NO₂ forming compound.

The systems and methods can also be used in low sulphur (<20 ppm) applications. When the systems and methods are used in low sulphur applications, it is anticipated that a reduced volume of catalyst will be needed.

When using the systems and methods described herein, the NO to NO₂ ratio has to be carefully balanced based on the composition of the fuel and the process conditions such that the fast SCR reaction is promoted. Having an excess of NO₂ in the feed will lead to the slow SCR reaction described in equation (3)

$$8NH_3 + 6NO_2 \rightarrow 7N_2 + 12H_2O \text{—Slow reaction} \quad (3)$$

The optimum ratio will be dependent on the catalyst material and flue gas conditions in particular, the reaction temperature. The ratio is generally in the range of 2:1 or less of NO:NO₂, preferably about 1:1 or less of NO:NO₂.

In some systems, it is preferred that a solution of urea is dosed separately into the system from the solution of the nitrate forming compound in order to achieve the optimum NO:NO₂ ratio across a wide range of conditions. In these systems, the amounts of urea and the NO₂ forming compound can be varied based on levels of sulfates and/or phosphates in the flue gas. Various sensors and control systems known in the art can be used in the system to control the addition of urea and the NO₂ forming compound.

EXAMPLES

Hereinafter, the present invention is described in more detail by reference to the Examples.

Example 1

The effects of the ratios of $NO:NO_2$ and temperature on the formation of $NO_x$ was determined by passing a gas with a composition listed in Table 1 through a vanadium-SCR honeycomb catalyst containing 1.7% vanadium.

TABLE 1

| Items | Values |
|---|---|
| Space velocity | 60000 h$^{-1}$ |
| Temperature | 200, 230, 250, 300, 350° C. |
| $O_2$ | 9.3% |
| $H_2O$ | 7% |
| Total NO$x$ | 200, 250, 300, 400 |
| $NO_2$ | 0, 50, 100, 200 |
| $NH_3$ | ANR = 1 |
| $N_2$ | Remainder of Gas |

The amount of total NOx, $NO_2$ and ammonia was determined using FT-IR.

The addition of at least one $NO_2$ forming compound, as described above, would be expected to result in higher levels of $NO_R$.

Figure 2:
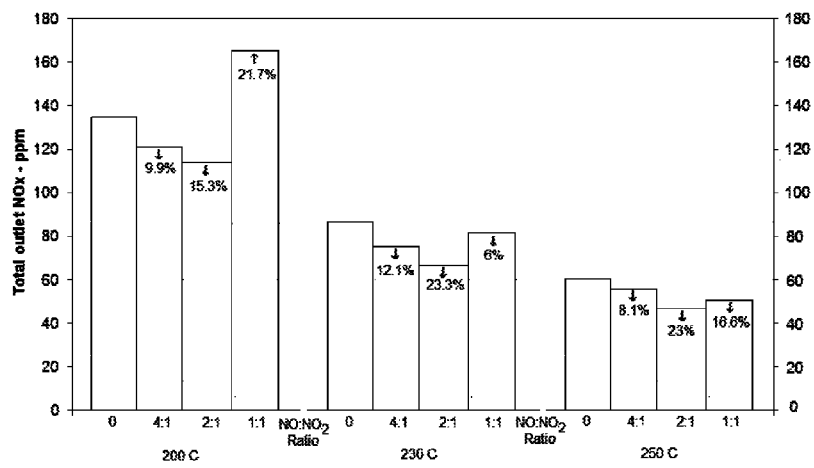
FIG. 2 is a graph showing the total outlet NOx levels at temperatures of 200, 230 and 250° C. at various $NO:NO_2$ ratios and the % reduction compared to a gas not having any NO ($NO:NO_2$ ratio of 0).
Figure 3:
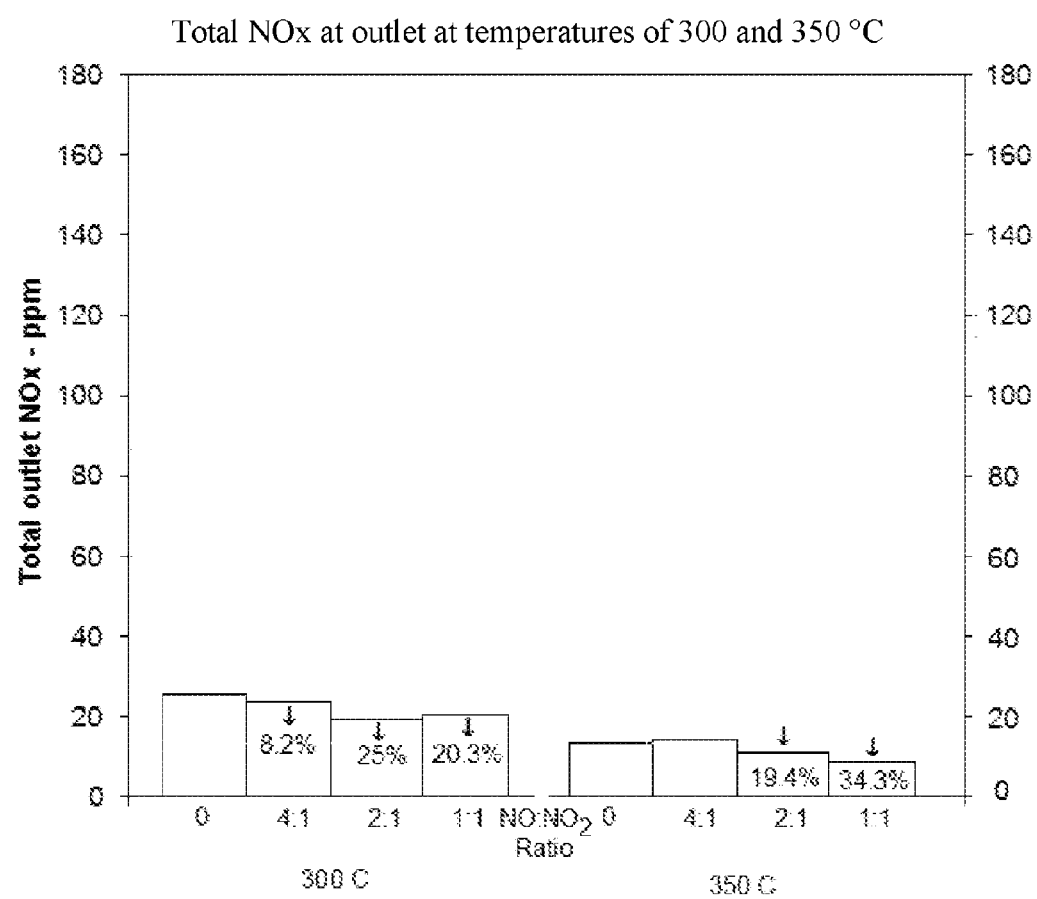
FIG. 3 is a graph showing the total outley outlet NOx levels at temperatures of 300 and 350° C. at various $NO:NO_2$ ratios and the % reduction compared to a gas not having any NO ($NO:NO_2$ ratio of 0).

FIG. 1 is a graph showing the NOx concentrations formed at temperatures of 200, 230, 250, 300 and 350° C. using $NO:NO_2$ ratios of 0, 1:1, 2:1 and 4:1. The amount of NOx formed decreased with temperature as expected. FIG. 2 is a graph showing the outlet NOx levels at temperatures of 200, 230 and 250° C. at various $NO:NO_2$ ratios. At these temperatures, except for the 1:1 $NO:NO_2$ ratio at 200° C., there was a decrease in the amount of NOx formed, compared to the amount of NOx formed without NO present. At each of these temperatures, the 2:1 ratio of $NO:NO_2$ provided the greatest reduction in NOx levels, with about 23% reduction at 230 and 250° C. FIG. 3 is a graph showing the outlet NOx levels at temperatures of 300 and 350° C. at various $NO:NO_2$ ratios. At 300° C., there was a decrease in the amount of NOx formed, compared to the amount of NOx formed without NO present. Again, the 2:1 ratio of $NO:NO_2$ provided the greatest reduction in NOx levels, about 25%. At 350° C., there was a reduction in Nox levels at $NO:NO_2$ ratios of 1:1 and at 2:1, with about 19% and 34% reduction at 300 and 350° C., respectively.

The results of the experiments are shown in FIGS. 1 and 2 in relative NOx conversion and outlet NOx levels respectively. FIG. 1 shows that the relative NOx conversions are improved especially at temperatures from about 200° C. to about 250° C. At higher temperatures (from about 300° C. to about 350° C., less of a change in is the relative NOx conversions is observed due to the higher conversion achieved in the absence of $NO_2$. At high temperatures, the concentration of outlet NOx is very low and small variations in the measurements can affect the percentage calculations. These measurements show that, surprisingly, the addition of $NO_2$ to an exhaust gas can result in reducing the levels of NOx formed.

The entire contents of any and all documents cited herein are incorporated herein by reference in their entirety.

The invention claimed is:

1. A system comprising: (a) a solution comprising urea and at least one $NO_2$ forming compound, wherein the at least one $NO_2$ forming compound comprises: (i) a metal salt of a nitrate; (ii) a mixture of a metal containing compound and $N_2O_4$, $N_2O_5$, or mixtures thereof; or (iii) mixtures of (i) and (ii), (b) an SCR catalyst, (c) flue gas upstream of the SCR catalyst and comprising SOx at a concentration of 20 ppm or greater, and (d) a device for introducing the solution into a flue gas stream prior to the flue gas coming in contact with an SCR catalyst, where the introduction of the solution allows for the continuous operation of the system at temperatures in the range of about 250 to about 350° C.

2. The system of claim 1, wherein the at least one $NO_2$ forming compound is a metal salt of a nitrate.

3. The system of claim 2, wherein the metal salt of a nitrate is an alkaline earth metal nitrate, iron nitrate, manganese nitrate or mixtures thereof.

4. The system of claim 3, wherein the metal salt of a nitrate is calcium nitrate or magnesium nitrate.

5. The system of claim 4, wherein the metal salt of a nitrate comprises calcium nitrate.

6. The system of claim 1, wherein the solution comprising urea and at least one $NO_2$ forming compound comprises $Ca(NO_3)_2 \cdot 4[OC(NH_2)_2]$, $5Ca(NO_3)_2 \cdot NH_4NO_3 \cdot 10H_2O$ or mixtures thereof.

7. The system of claim 1, wherein the metal containing compound is a metal salt.

8. The system of claim 2, wherein the metal salt is an alkaline earth metal salt, an iron salt, a manganese salt or mixtures thereof.

9. A method for reducing the amount of $SO_3$ in a flue gas, said method comprising introducing a solution comprising urea and at least one $NO_2$ forming compound into a flue gas stream prior to the flue gas coming in contact with an SCR catalyst, wherein the at least one $NO_2$ forming compound comprises: (i) a metal salt of a nitrate; (ii) a mixture of a metal containing compound and $N_2O_4$, $N_2O_5$, or mixtures thereof; or (iii) mixtures of (i) and (ii).

10. The method of claim 9, wherein the flue gas contacts the SCR catalyst at a temperature in the range of about 200 to about 350° C.

11. The method of claim 9, wherein said method also reduces the amount of phosphate.

12. The method of claim 9, wherein the at least one $NO_2$ forming compound is a metal salt of a nitrate.

13. The method of claim 12, wherein the metal salt of a nitrate is an alkaline earth metal nitrate, iron nitrate, manganese nitrate or mixtures thereof.

14. The method of claim 12, wherein the metal salt of a nitrate is calcium nitrate or magnesium nitrate.

15. The method of claim 14, wherein the metal salt of a nitrate comprises calcium nitrate.

16. The method of claim 9, wherein the solution comprising urea and at least one $NO_2$ forming compound comprises $Ca(NO_3)_2 \cdot 4[OC(NH_2)_2]$, $5Ca(NO_3)_2 \cdot NH_4NO_3 \cdot 10H_2O$ or mixtures thereof.

17. The method of claim 9, wherein the metal containing compound is a metal salt.

18. The method of claim 17, wherein the metal salt is an alkaline earth metal salt, an iron salt, a manganese salt or mixtures thereof.

19. A method for reducing the formation of ammonium bisulphate in a urea-SCR system, the method comprising introducing a solution comprising urea and at least one $NO_2$ forming compound into a flue gas stream prior to the flue gas coming in contact with an SCR catalyst, wherein the at least one $NO_2$ forming compound comprises: (i) a metal salt of a nitrate; (ii) a mixture of a metal containing compound and $N_2O_4$, $N_2O_5$, or mixtures thereof; or (iii) mixtures of (i) and (ii).

20. The method of claim 19, wherein the flue gas comprises $SO_x$ at a concentration of 20 ppm or greater prior to the flue gas coming in contact with the SCR catalyst, and the flue gas contacts the SCR catalyst at a temperature in the range of about 200 to about 350° C.

* * * * *